INVENTORS
Russell J. Cameron
Daniel B. Abbott
BY
Harness, Dickey & Pierce
ATTORNEYS April 6, 1965   R. J. CAMERON ETAL   3,176,954
CONVERTIBLE VALVE ASSEMBLY
Filed April 13, 1961   3 Sheets-Sheet 2
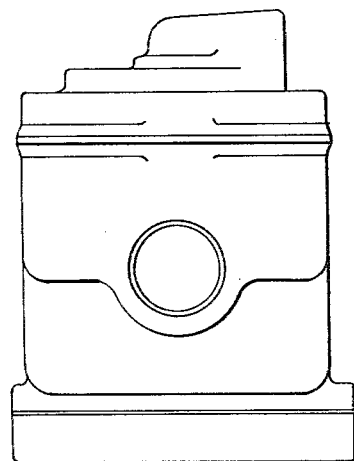
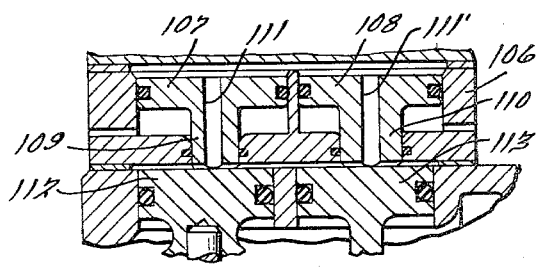
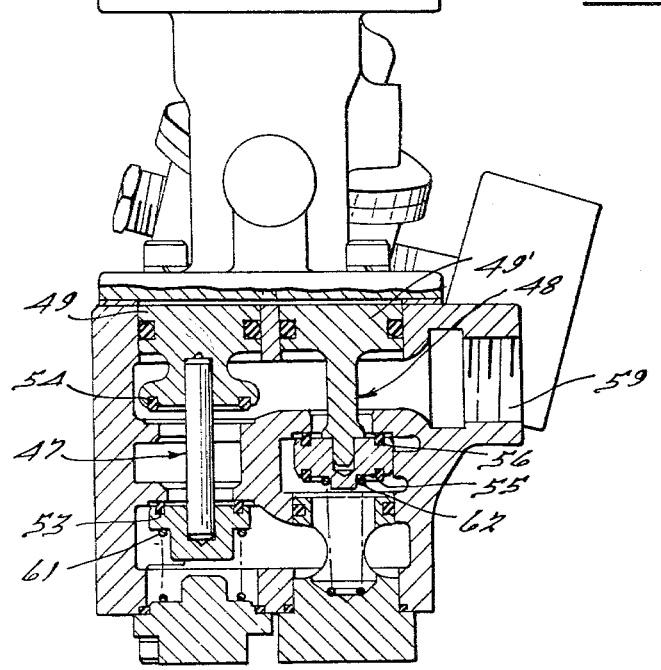
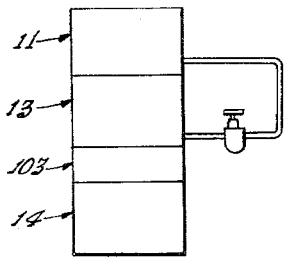
INVENTORS
Russell J. Cameron.
Daniel B. Abbott.
BY
Harness Dickey & Pierce
ATTORNEYS

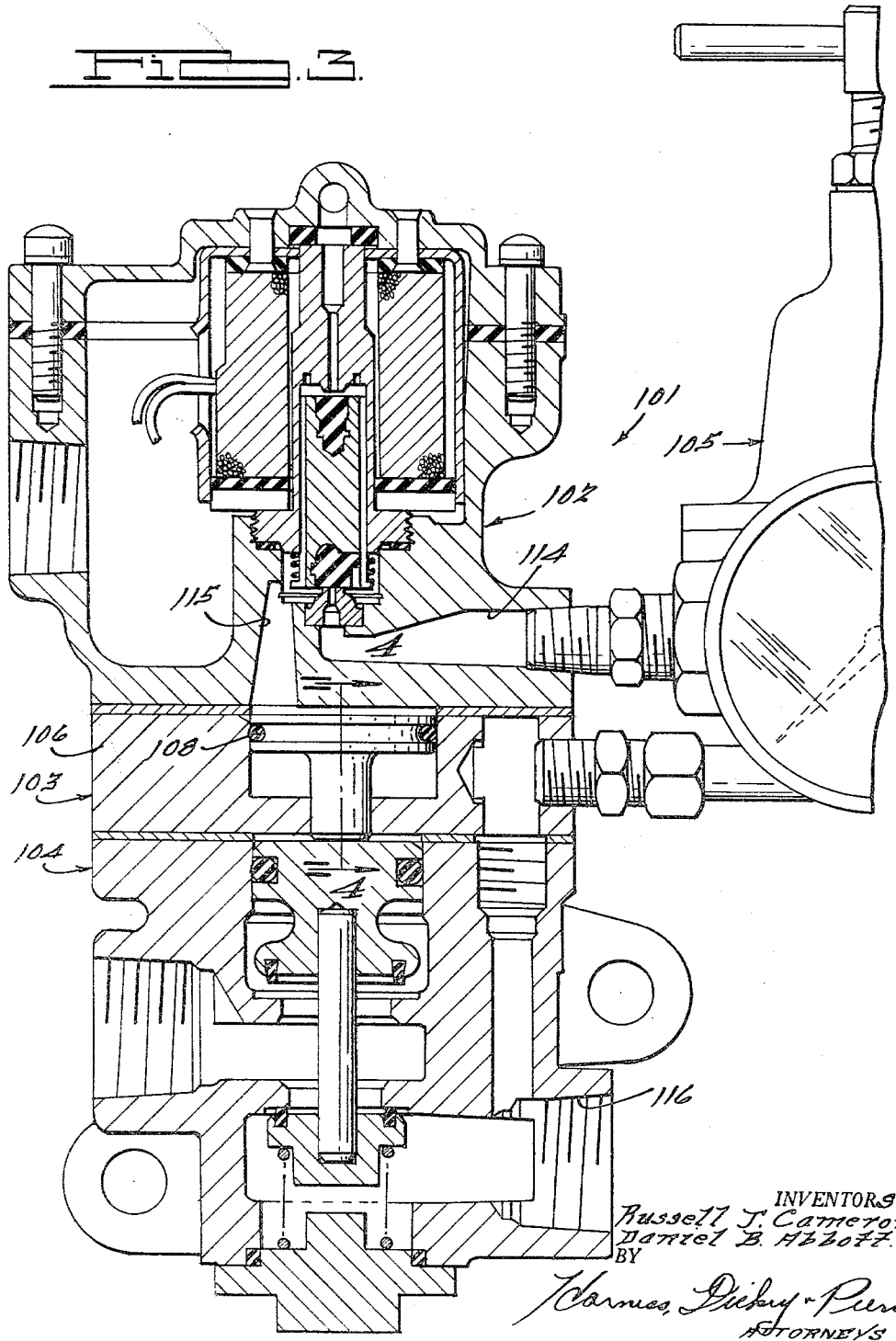

United States Patent Office 3,176,954
Patented Apr. 6, 1965

3,176,954
CONVERTIBLE VALVE ASSEMBLY
Russell J. Cameron, Birmingham, and Daniel B. Abbott, Clawson, Mich., assignors to Ross Operating Valve Company, Detroit, Mich., a corporation of Michigan
Filed Apr. 13, 1961, Ser. No. 102,778
4 Claims. (Cl. 251—29)

This application relates to valve assemblies, and more particularly to solenoid-operated valves for use in industrial installations and under various pressure supply conditions.

In the use of solenoid-operated valves for industrial installations, such as for the control of pneumatic circuits, difficulty is frequently encountered when a solenoid-operated pilot valve is to be used in conjunction with a fluid-operated main control valve, in that the available air pressure supply is outside the range in which the pilot valve can efficiently operate. Frequently, for example, a relatively high plant pressure is available, and if this is supplied directly to the pilot valve, it is found that the solenoid assembly does not have sufficient strength to shift the pilot valve between its positions in opposition to the supply pressure.

Solutions such as reduction of the pilot valve diameter are often unsatisfactory in that the rate of action of the main valve is thereby considerably reduced. Increasing the size of the solenoid, on the other hand, has the drawback of increased cost.

In other cases, the available supply pressure may be too low to obtain rapid shifting of the main valve between its positions when the pilot valve is operated, in which case it may be found necessary to provide an auxiliary piston in tandem with the main valve piston so as to obtain an increased shifting force.

It is the general object of the present invention to provide a novel and improved valve assembly comprising interchangeable components and including a pressure regulator as part of the assembly package, the components being so constructed as to greatly increase the available pressure operating range in an extremely convenient and inexpensive manner.

Other objects, features, and advantages of the present invention will become apparent from the subsequent description, taken in conjunction with the accompanying drawings.

In the drawings:

FIGURE 2 is a view taken in the direction of the arrow 2 of FIGURE 1, the lower portion of this view being cross-sectioned to show the nature of the dual main valve;

FIGURE 3 is a cross-sectional view in elevation similar to FIGURE 1 of another embodiment of the invention in which the intermediate pilot valve is replaced by an auxiliary main valve piston assembly for use with relatively low pressures;

FIGURE 4 is a cross-sectional view taken along the line 4—4 of FIGURE 3 and showing the connections between the two auxiliary main valve pistons and the main valve pistons; and FIGURE 5 is a schematic showing of another embodiment usable with both high and low pressures.

Figure 1:
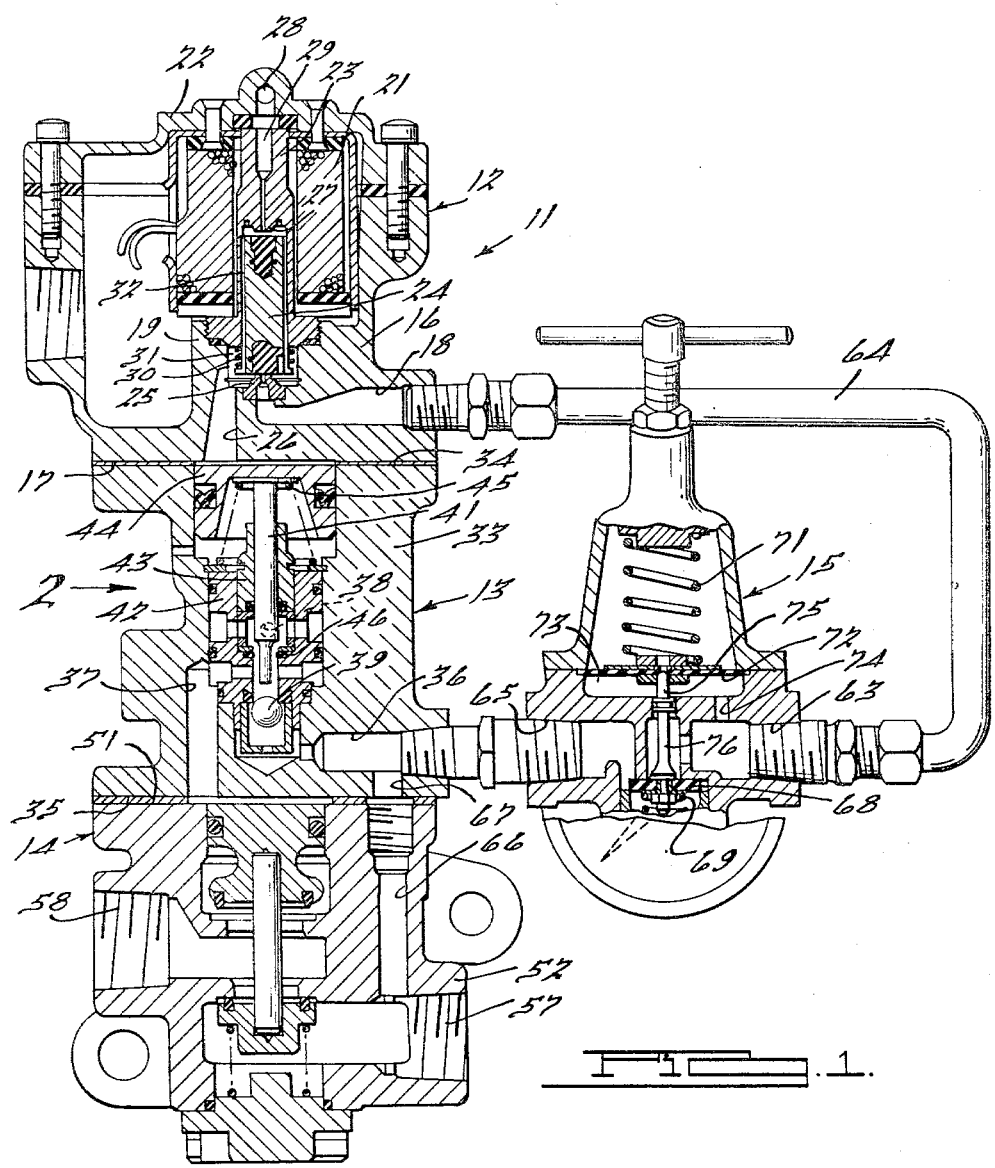
FIGURE 1 is a cross-sectional view in elevation of one embodiment of the invention, showing the relationship between the pilot valve, intermediate pilot valve, main valve and pressure regulator for use with relatively high pressures.

In general terms, the invention comprises a main piston-operated valve, a solenoid-operated pilot valve, and force-multiplying means interposed between said valves for enabling the pilot valve to be solenoid-operated within its intended supply pressure range while at the same time utilizing the actually available supply pressure in the plant for operating the main valve. In one illustrated embodiment, the intermediate component comprises an auxiliary pilot valve piston operated by the outlet from the solenoid-operated pilot valve to control a relatively high available supply pressure to the main valve piston. In another embodiment, for use when relatively low supply pressure is available, the intermediate unit comprises a piston actuatable by the solenoid-operated pilot valve outlet and engageable with the main valve to increase the force thereon.

The ports, housings and other constructional features of the pilot valve, intermediate unit and main valve are so selected as to be capable of assembly in various arrangements, together with a pressure regulator which can be preset to supply air pressure to the pilot valve within its desired operating range. Thus, for example, should it be desired to provide an assembly operable between extremely low and extremely high supply pressures, both intermediate units described above could be combined in a single assembly, together with the pilot valve, the main valve and the pressure regulator.

Referring more particularly to the drawings, the embodiment of FIGURE 1 is generally indicated at 11 and comprises a solenoid-operated pilot valve generally indicated at 12, an intermediate pilot valve generally indicated at 13, a main valve assembly generally indicated at 14, and a pressure regulator generally indicated at 15.

Pilot valve 12 includes a housing 16 having a flat lower surface 17, an inlet port 18 leading into the lower portion of the housing, and a boss 19 within the housing on which is mounted a solenoid 21 held in position by a cap 22. A central guide member 23 extends through solenoid 21 and is secured between boss 19 and cap 22, and a plunger or armature 24 is slidably mounted in the lower portion of guide 23. Plunger 24 is movable between a lower or deenergized position and an upper or energized position. In its lower position, plunger 24 engages an inlet valve seat 25, shutting off the passage of fluid from this valve seat, which is connected to inlet 18, and a working or outlet port 26 leading to lower surface 17. In its upper position, plunger 24 is withdrawn from valve seat 25, but engages an exhaust valve seat 27 at an intermediate portion of guide 23 which is connected to an exhaust port 28 by a central passage 29 in guide 23. A spring 30 urges plunger 24 toward its lower position. Chamber 31 in boss 19, which is connected to working port 26, is connected to exhaust seat 27 by channels 32 between plunger 24 and guide 23.

Intermediate pilot section 13 includes a housing 33 having a flat upper surface 34 and a flat lower surface 35. Housing 33 has a pressure inlet port 36 at the lower end thereof and a working or outlet port 37 leading toward lower surface 35, an exhaust port 38 leading from an intermediate section of the housing. A valve 39 is provided between inlet port 36 and outlet port 37, this valve being movable downwardly away from its normally closed position by a plunger 41 slidably mounted within a stationary spool 42 having an insert 43. A piston 44 is slidably mounted in the upper end of housing 33 and is exposed at its upper end to upper surface 34, which is connected to working port 26 of pilot valve 12. A spring 45 normally urges piston 44 and plunger 41 to their upper position. A normally open exhaust valve 46 carried by spool 42 above valve 39 is closable by plunger 41 when the plunger is moved to its lower position so as to close the connection between working port 37 and exhaust port 38.

Main valve assembly 14 is shown as including two three-way valves in parallel relation, as seen in FIGURE 2, although other types of valves could be used. These two valves are designated generally as 47 and 48 respectively, valve 47 being normally closed while valve 48 is normally open. Each of these valves comprises a piston 49 or 49′ connected at its upper end to the upper flat surface 51 of main valve housing 52. Poppet valves are attached to each piston, those for valve 47 being designated at 53 and 54 in FIGURE 2, whereas those for 48 are designated at 55 and 56. Supply valves 53 and 55 control the connection between pressure port 57 and the working ports of valves 47 and 48, one of which is seen at 58 in FIGURE 1, whereas exhaust valves 54 and 56 control the connections between working ports 58 and exhaust port 59. Normally, a spring 61 will hold normally closed valve 47 in its upper position as seen in FIGURE 2, whereas a spring 62 will hold normally open valve 48 in its upper position. Pressure supplied from intermediate pilot valve outlet 37 to pistons 49 and 49′ will shift valves 47 and 48 to their lower positions.

Pressure regulator 15 is of a conventional type capable of supplying reduced pressure of a preset amount to its outlet port 63 which is connected by a conduit 64 to inlet port 18 of pilot valve 12. Inlet port 65 of pressure regulator 15 is connected to port 36 of intermediate pilot valve body 33. Pressure to this port is supplied from pressure port 57 of main valve assembly 14, a conduit 66 leading upwardly through the main valve assembly body and being connected to a short conduit 67 within body 33 leading to port 36. Regulator 15 has a valve 68 connecting ports 65 and 63, this valve being urged by a spring 69 towards its closed position and by a spring 71 of adjustable strength towards its open position.

Spring 71 engages a diaphragm 72 exposed to a chamber 73 which is connected to outlet port 63 by a passage 74 so that an increase of pressure in chamber 73 will urge diaphragm 72 upwardly, tending to close valve 68 and reduce the outlet pressure. The regulator may be of a self-bleeding or relieving type, with a valve 75 carried by the stem 76 of valve 68 and connecting chamber 73 to exhaust.

In operation of the assembly, let us assume, for example, that solenoid-operated pilot valve 12 is designed to operate efficiently when the pressure at inlet port 18 is below 150 p.s.i. Assuming further that the supply pressure available in a particular plant is 250 p.s.i., this could not normally be connected directly to solenoid port 18 since solenoid 21 and its associated parts would not be of sufficient strength to operate against this pressure. However, with the 250 p.s.i. supply line connected to port 57 of valve assembly 14, and with pressure regulator 15 set to supply pressure at, say, 30 p.s.i. to port 18, pilot valve 12 may be efficiently operated. When solenoid 21 is energized, 30 p.s.i. pressure will flow to outlet port 26 of pilot valve 12 and act upon piston 44. This will cause valve 39 to open, and pressure at 250 p.s.i. will flow to outlet port 37 of intermediate pilot valve 13. This will in turn quickly shift normally closed valve 47 and normally open valve 48 to their open and closed positions respectively. Deenergization of solenoid 21 will cause port 26 to be connected to exhaust port 28, and spring 45 will return intermediate pilot valve 13 to its upper or exhaust position. This will cause outlet port 37 to be connected to exhaust port 38, and valves 47 and 48 will be shifted to their upper positions by springs 61 and 62 respectively.

The 250 p.s.i. supply pressure is thus made available to operate the main valve pistons of main valve assembly 14, whereas this high pressure is isolated from pilot valve 12. Intermediate pilot valve 13 thus acts in the nature of a relay whereby a relatively low pressure supplied to a solenoid-operated pilot valve may be made to control the flow of the much higher pressure to the main valve pistons.

FIGURES 3 and 4 illustrate another embodiment of the invention in which relatively low supply pressures may be utilized for rapidly shifting the main valves. This embodiment is generally indicated at 101 and includes a solenoid-operated pilot valve generally indicated at 102, an auxiliary piston assembly generally indicated at 103, and a main valve assembly generally indicated at 104, together with a pressure regulator generally indicated at 105. Components 102, 104 and 105 are shown as similar in construction to components 12, 14 and 15 of the previous embodiment, and therefore need not be described in detail, except to mention that the port arrangement of pressure regulator 105 may be somewhat different than that of pressure regulator 15 because of the lesser height of component 103 as compared with component 13.

Auxiliary piston assembly 103 comprises a body 106 having a pair of pistons 107 and 108 slidable therein as seen in FIGURE 4. The lower ends of these pistons comprise piston rods 109 and 110 respectively, and these rods extend downwardly through the lower surface of body 106. Passages 111 and 111′ are also provided through the centers of pistons 107 and 108 and their stems 109 and 110, these passages leading from the chambers above pistons 107 and 108 to the chambers above pistons 112 and 113, stems 109 and 110 engaging pistons 112 and 113. The two sets of pistons and auxiliary pistons will therefore act in tandem and unison to exert downward forces on their respective valves. The diameters of pistons 107 and 108 are shown as being substantially greater than those of pistons 112 and 113, so that the downward force exerted by the auxiliary pistons is greater than that which is exerted by air pressure on the main pistons.

In operation of the embodiments of FIGURES 3 and 4, assuming again that the solenoid-operated pilot valve can operate efficiently up to a range of 150 p.s.i., regulator 105 may be set so as to supply pressure at or near this pressure to inlet port 114 of pilot valve 102. When the pilot valve is energized, this pressure will be supplied to outlet port 115 of the pilot valve, and thus to the two pistons 107 and 108. This will cause a downward force to be exerted on pistons 112 and 113 of the valves in main valve assembly 104, this force being substantially greater than would otherwise be exerted on these valves were the supply pressure connected directly to pistons 112 and 113. Should the available supply pressure at main valve inlet port 116 (which is the maximum pressure available at pilot valve inlet port 114) drop considerably for some reason, that is, below the set point of the regulator, the latter will open and this pressure will therefore still be acting on the larger areas of pistons 107 and 108 as well as on pistons 112 and 113.

The presence of regulator 105 in the embodiment of FIGURES 3 and 4 could also serve to restrict destructive energy forces in installations intended primarily for low pressure operation. By setting the regulator, for example, at 75 p.s.i., sudden surges of higher pressure which might otherwise cause damage to the main valve because of the large area being acted upon, will be prevented from having a deleterious effect.

If it is desired to provide an assembly which would be operable between extremely low and extremely high pressure range limits, both components 13 and 103 could be used together with the solenoid-operated pilot valve and the main valve. In this case, as shown schematically in FIGURE 5 auxiliary piston unit 103 would be inserted, for example, between components 13 and 14 in FIGURE 1. The available supply pressure, no matter how high, would thus be directly connectable to the main valve operating and auxiliary operating pistons, and since an auxiliary piston is provided for each main valve, extremely low supply pressures would be also usable. Should the supply pressure increase to a very high value, the setting of the pressure regulator would still permit the solenoid-operated pilot valve to operate, without interfering with the availability of this extremely high supply pressure for operating the main valve. In order to permit these various alternative arrangements to be made, the mating surfaces and ports of the various components will be appropriately shaped and positioned.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In combination, a piston-operated main valve having a valve seat, inlet, outlet, piston, piston chamber and an upper housing surface to which the piston chamber is connected, a solenoid-operated pilot valve having a lower housing surface, a plunger, and inlet and outlet ports, the inlet port being in opposed relation with the plunger when the plunger moves to one position closing said inlet port, a spring urging said plunger toward said one position, whereby the spring must counteract the inlet pressure, a solenoid for moving said plunger away from said inlet port against the action of said spring, force-multiplying means between said pilot valve and main valve, said force-multiplying means having a housing with a lower housing surface connected with the upper main valve housing surface and an upper housing surface connected with the lower pilot valve housing surface, said force-multiplying means further having a piston slidably mounted in its housing and having a piston chamber connected to said upper housing surface of the force-multiplying means, the outlet port of said pilot valve being connected with the lower housing surface thereof and thereby with said chamber, a force-transmitting portion of said force-multiplying means extending to the lower housing surface thereof and thereby being connected to said main valve, a supply port for said main valve, and a pressure regulator having an inlet connected to said supply port and an outlet connected to said pilot valve inlet port.

2. The combination according to claim 1, said force-multiplying means comprising an auxiliary pilot valve having an inlet port, and a direct connection between the supply port of said main valve and said last-mentioned inlet port, said force-transmitting portion of the force-multiplying means comprising an outlet port for said auxiliary pilot valve connected to the piston chamber of said main valve.

3. The combination according to claim 1, said force-multiplying means comprising an auxiliary piston assembly, said force-transmitting portion of the force-multiplying means comprising an extension on the piston of said force-multiplying means projecting through its lower housing surface and engageable with the main valve piston, and a fluid connection between the piston chamber of said force-multiplying means and the piston chamber of said main valve.

4. In combination, a piston-operated main valve having a valve seat, inlet, outlet, piston, piston chamber and an upper housing surface to which the piston chamber is connected, a solenoid-operated pilot valve having a lower housing surface, a plunger and inlet and outlet ports, the inlet port being in opposed relation with the plunger when the plunger moves to one position closing said inlet port, a spring urging said plunger toward said one position, whereby the spring must counteract the inlet pressure, a solenoid for moving said plunger away from said inlet port against the action of said spring, first force-multiplying means comprising an auxiliary pilot valve having an upper housing surface connected to the lower housing surface of said pilot valve and a lower housing surface, a piston in said auxiliary pilot valve having a chamber connected to said upper housing surface, the outlet port of said pilot valve being connected to its lower housing surface and thereby to said auxiliary pilot valve chamber, an outlet port for said auxiliary pilot valve extending to the lower housing surface thereof, second force-multiplying means comprising an auxiliary piston assembly having a lower housing surface connected with the upper main valve housing surface and an upper housing surface connected with the lower auxiliary pilot valve housing surface, a piston slidably mounted in said auxiliary piston assembly and having a chamber connected to the upper housing surface thereof and thereby to said auxiliary pilot valve outlet port, a connection between said auxiliary piston assembly chamber and the lower housing surface of said auxiliary piston assembly, said last-mentioned connection thereby being connected with said main valve piston chamber, a supply port for said main valve, an inlet port for said auxiliary pilot valve, a direct connection between said main valve supply port and auxiliary pilot valve inlet port, and a pressure regulator connected between said main valve supply port and said pilot valve inlet port.

References Cited by the Examiner

UNITED STATES PATENTS

| 2,373,654 | 4/45 | Beekley et al. | 251—29 X |
| 2,617,444 | 11/52 | Gardner | 251—30 XR |
| 2,624,585 | 1/53 | Churchill et al. | 251—30 XR |
| 2,732,860 | 1/56 | Ray | 137—625.64 |
| 2,896,413 | 7/59 | Hussey | 92—62 |
| 2,977,155 | 3/61 | Patterson | 251—30 XR |
| 3,110,468 | 11/63 | Herion | 251—30 |

OTHER REFERENCES

Hydraulic Handbook, Trade and Technical Press, England, 1960, Scientific Library (pages 82 and 83, FIG. 127).

M. CARY NELSON, *Primary Examiner.*

KARL J. ALBRECHT, MILTON KAUFMAN, LAVERNE D. GEIGER, *Examiners.*